United States Patent
Mishra

(10) Patent No.: US 6,923,362 B2
(45) Date of Patent: Aug. 2, 2005

(54) INTEGRAL CHANNELS IN METAL COMPONENTS AND FABRICATION THEREOF

(75) Inventor: Rajiv S. Mishra, Rolla, MO (US)

(73) Assignee: The Curators of University of Missouri, Columbia, MO (US)

(*) Notice: Subject to any disclaimer, the term of this patent is extended or adjusted under 35 U.S.C. 154(b) by 205 days.

(21) Appl. No.: 10/261,036

(22) Filed: Sep. 30, 2002

(65) Prior Publication Data

US 2004/0060965 A1 Apr. 1, 2004

(51) Int. Cl.[7] .............................................. B23K 20/12
(52) U.S. Cl. .................................... 228/112.1; 228/2.1
(58) Field of Search ............................. 228/112.1, 2.1; 175/398

(56) References Cited

U.S. PATENT DOCUMENTS

| | | | |
|---|---|---|---|
| 3,630,878 A | * 12/1971 | Haggerty ..................... | 204/225 |
| 3,753,364 A | * 8/1973 | Runyan et al. ................ | 72/71 |
| 4,604,012 A | * 8/1986 | Kawasaki et al. .......... | 409/233 |
| RE34,435 E | * 11/1993 | Warren et al. .............. | 175/398 |
| 5,324,368 A | 6/1994 | Masumoto et al. | |
| 5,460,317 A | 10/1995 | Thomas et al. | |
| 5,718,366 A | 2/1998 | Colligan | |
| 5,794,835 A | 8/1998 | Colligan et al. | |
| 6,029,879 A | * 2/2000 | Cocks ........................ | 228/2.1 |
| 6,053,391 A | 4/2000 | Heideman et al. | |
| 6,138,895 A | 10/2000 | Oelgoetz et al. | |
| 6,227,430 B1 | 5/2001 | Rosen et al. | |
| 6,257,479 B1 | 7/2001 | Litwinski et al. | |
| 6,298,962 B1 | 10/2001 | Kato et al. | |
| 6,299,050 B1 | 10/2001 | Okamura et al. | |
| 6,302,315 B1 | 10/2001 | Thompson | |
| 6,398,883 B1 | 6/2002 | Forrest et al. | |
| 6,656,019 B1 | * 12/2003 | Chen et al. ................... | 451/41 |
| 2002/0079351 A1 | 6/2002 | Mishra et al. | |
| 2003/0181101 A1 | * 9/2003 | Soriano ....................... | 439/587 |
| 2004/0194942 A1 | * 10/2004 | Okamoto et al. ........... | 165/170 |

FOREIGN PATENT DOCUMENTS

| | | |
|---|---|---|
| JP | 411047859 A | 2/1999 |
| JP | 02001047260 A | 2/2001 |
| WO | WO 93/10935 | 6/1993 |

OTHER PUBLICATIONS

Mishra, et al., High Strain Rate Superplasticity in a Friction Stir Processed 7075 Al Alloy, Scripta mater. 42 (2000) 163–168.

Mishra, et al., Friction Stir Processing: A New Grain Refinement Technique to Achieve High Strain Superplasticity in Commerical Alloys, Superplasticity in Advanced Materials, ICSAM–2000 Materials Science Forum, 357–3 (2001) 507.

Mahoney et al., Properties of Friction–Stir–Welded 7075 T651 Aluminum, Metallurgical and Materials Transactions, vol. 29A, Jul. 1998, pp. 1955–1964.

Rhodes et al., Effects of Friction Stir Welding on Microstructure of 7075 Aluminum, Scripta Materialia, vol. 36, No. 1, 1997, pp. 69–75.

Inoue et al., Viscous Flow Deformation in Supercooled Liquid State of Bulk Amorphous $Zr_{55}Al_{10}Ni_5Cu_{30}$ Alloy, Materials Transactions, JIM, vol. 37, No. 6 (1996), pp. 1337 to 1341.

Saotome et al., Superplastic Extrusion of Microgear Shaft of 10 $\mu$m in Module, Technical Information Service of Purdue University, Jun. 1999, pp 126–129.

Xu et al., Rapid–Protyping Process, Solid Freeform Fabrication Proceedings (1998).

* cited by examiner

*Primary Examiner*—Lynne R. Edmondson
(74) *Attorney, Agent, or Firm*—Senniger Powers

(57) ABSTRACT

An internal channel in a metal body for use in applications where internal fluid flow within a metal body is desired, as in a heat exchanger. The internal channel is formed in the metal body by frictionally stirring with a pin plunged into the metal body, and traversing the metal body with the pin.

29 Claims, 3 Drawing Sheets

INTEGRAL CHANNELS IN METAL COMPONENTS AND FABRICATION THEREOF

BACKGROUND OF THE INVENTION

This invention relates to metal components with integral channels, and to a method of integrating channels into metal components.

In the manufacture of a wide variety of industrial and other components it is desirable to incorporate a channel through an otherwise solid metallic body. For example, the combustion chamber in the space shuttle main engine has cooling channels. Dies for die casting metal have cooling channels. Heat exchangers for a wide variety of industrial processes have integral channels.

Heretofore one method of manufacturing channels into solid metal bodies has been by boring to remove metal. A limitation of this method is that it is difficult to bore other than straight channels. Another method has been to machine mating metal surfaces to form mating grooves, and then join the mating surfaces. A disadvantage of this method is that joining is involved, while it would be more desirable to be able to manufacture channels directly into a solid metal, rather than into two separate bodies to be joined.

Xu et al. disclosed a rapid-prototyping process to position cooling channels in investment casting tooling as at X. Xu, E. Sachs, S. Allen and M. Cima, Solid Freeform Fabrication Proceedings, 1998, also available at www.oit.doe.gov/inventions/factsheets/emtec.pdf.

SUMMARY OF THE INVENTION

Among the objects of the invention, therefore, are to provide a method of integrating channels into metal components; such a method involving non-linear channels; and such a method which does not require a metals joining operation.

Briefly, therefore, the invention is directed to a method for forming an internal channel in a metal body comprising contacting a surface of the metal body with a pin, rotating the pin to frictionally heat the surface of the metal body where the pin contacts the metal body, plunging the rotating pin into the metal body in a direction generally perpendicular to the surface of the metal body, and moving the pin in a direction generally parallel to the surface of the metal body to thereby form the internal channel in the metal body.

The invention is also directed to a metal body comprising an external surface, a longitudinally seamless internal non-linear channel, and at least one opening at the external surface for fluid communication with the seamless internal non-linear channel.

In another aspect the invention is directed to a heat exchanger comprising a metal body having an external surface, a longitudinally seamless internal non-linear channel in the metal body, and at least one opening at the external surface for fluid communication with the seamless internal non-linear channel.

The invention also encompasses a friction stir pin for creating a channel in a metal body, the friction stir pin comprising a first longitudinal pin segment which is threaded circumferentially downward in a first direction selected from between clockwise and counterclockwise, and a second longitudinal pin segment which is threaded circumferentially downward in a second direction opposite the first direction.

Other objects and features will be in part apparent and in part pointed out hereinafter.

DETAILED DESCRIPTION OF THE PREFERRED EMBODIMENTS

In accordance with this invention, a channel is formed in a solid metal body by a process utilizing rotational friction of the type generated in friction stir welding and friction stir processing. Friction stirring arrangements of the type suitable for carrying out the friction stirring component of the invention are known in the art as disclosed, for example, in U.S. Pat. Nos. 5,460,317; 5,718,366; 6,227,430; 6,138,895; and 5,794,835.

Figure 1:
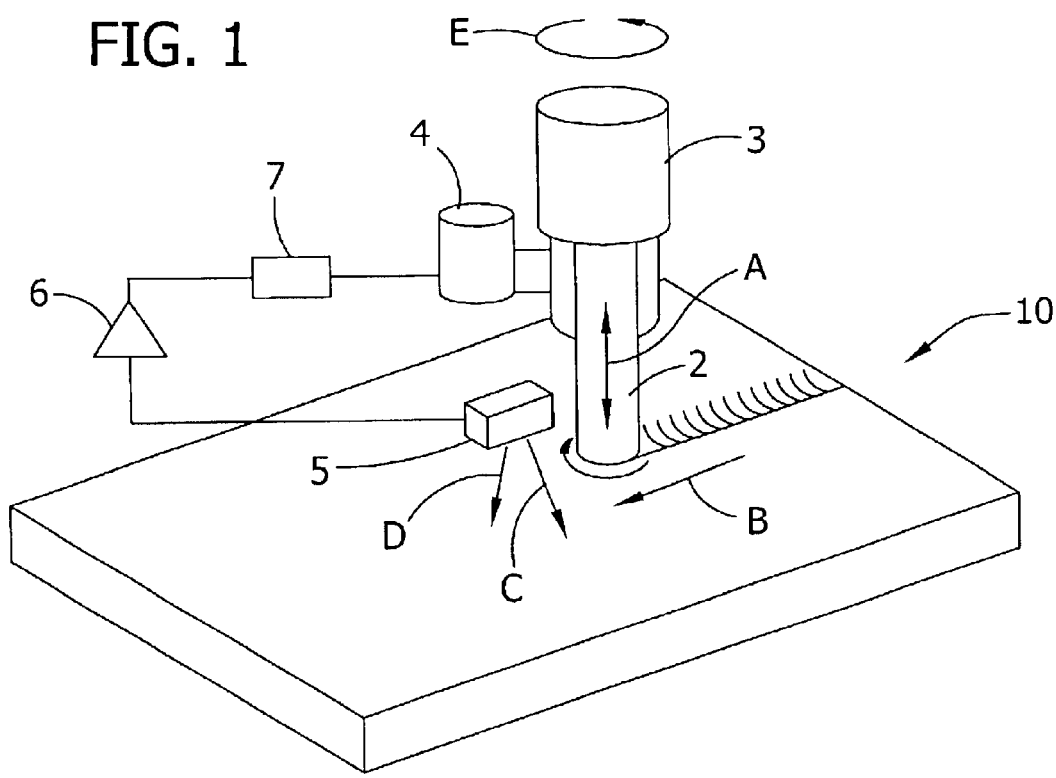
FIG. 1. is a schematic perspective view showing a friction stir apparatus.

One device suitable to be operated according to the parameters of the invention to perform the method of the invention is disclosed in U.S. Pat. No. 6,299,050 and illustrated in FIGS. 1 and 2 herein. There is a tool 2, a rotation driver 3, and a vertical driver 4 for moving the tool up and down along the direction A of its rotation axis. Detector 5 is mounted at a predetermined position with respect to the tool, travels with the tool, and detects distance to the surface of the workpiece. Signal processor 6 and vertical controller 7 cooperate to control the vertical position of the tool. The rotation driver 3 and vertical driver 4 are mounted on a movable frame for moving relative to the workpiece in a direction such as directions B, C, and D.

Figure 2:
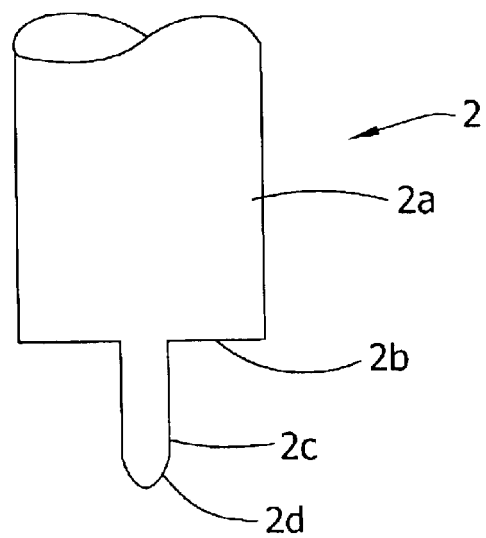
FIG. 2 is a cross-sectional view of a tool of a friction stir apparatus.

As illustrated in FIG. 2, the tool 2 disclosed schematically in U.S. Pat. No. 6,299,050 and suitable for use in connection with the present invention has a base 2a, a tip portion 2b, a shoulder portion 2b, a tip portion 2c, and a tip 2d.

In carrying out the invention, the rotating pin or tool 2 is contacted with the surface of a metal body 10. Friction between the pin rotating in direction E and the bulk metal results in localized heating which permits the pin to be plunged into the metal.

Once a required surface temperature and softness are reached, the pin is plunged into the bulk metal to a particular depth, and then moved to traverse through the metal. As the pin traverses the bulk metal, the metal moves in a complicated manner from the leading edge of the pin to around the trailing edge of the pin. In normal friction stir welding and other friction stir processing, conditions such as rotation speed, pin geometry, and traverse speed are selected so that the movement of bulk metal is such that bulk metal completely closes in around the pin at the trailing edge, leaving solid metal at the surface and through the complete depth to which the pin was plunged. In the process of the invention, however, these conditions are selected such that bulk metal does not close in completely behind the traversing pin, but rather a channel is left behind. In particular, conditions are selected as discussed in more detail below so that the bulk metal closes in behind the traversing pin at the surface, but not at a particular depth, thus leaving a channel within the interior of the bulk metal.

In traversing the metal, the pin is moved in a direction generally parallel to the metal surface, by which it is meant that the pin traverses the bulk metal from one point on the surface to another point (for example, direction B in FIG. 1 perpendicular to pin rotation axis direction A) on the surface, including situations both where the pin stays at the same depth throughout the traversal as well as situations where the pin depth is changed during traversal to change the depth of the channel. In these latter instances, the direction of pin movement is not exactly parallel to the surface.

Figure 3:
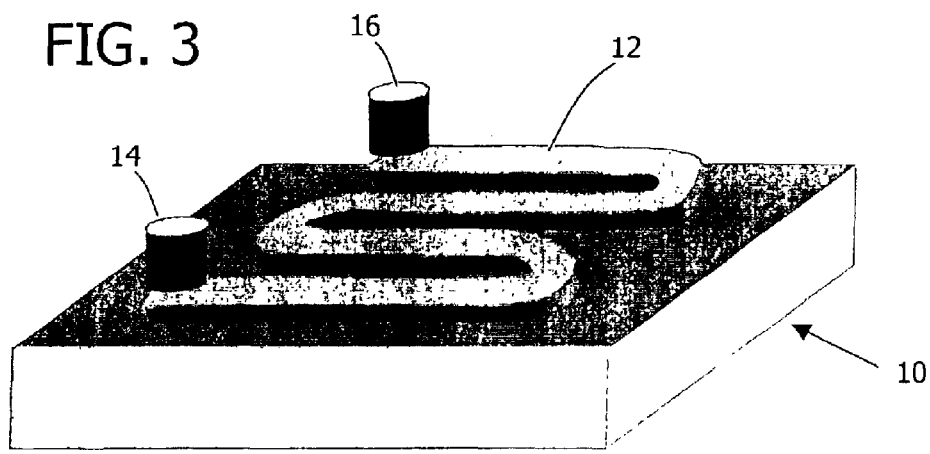
FIG. 3 is a schematic illustration of a monolithic plate with an internal channel imparted to the plate according to the invention.

FIG. 3 is a schematic illustration of a solid metal plate 10 with an internal cooling channel 12 imparted to the plate by the friction stir channeling process of the invention. Inlet and outlet connectors 14 and 16 are attached to provide fluid communication with the channel 12.

One of the parameters which is adjusted to impart a channel of desired geometry is the traverse speed of the pin. As a general proposition, for certain materials, the traverse speed is from about 0.5 inches/min (ipm) to about 24 ipm, and the rotation is from about 200 rpm to about 2000 rpm. For a particular metal, pin geometry, and pin rotation speed, varying the traverse speed varies the channel geometry. In carrying out the invention it is typically necessary to run a number of trials to determine the combination of traverse speed, rotation, and tool geometry which produces the desired channel.

Figure 4:
FIGS. 4, 5, and 6 are photomicrographs of cross sections of channels imparted into metal plates by the method of the invention.
Figure 5:
Figure 6:
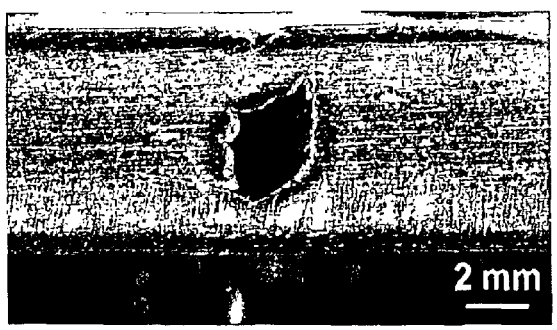

FIGS. 4, 5, and 6 are photomicrographs taken along cross sections of channels imparted into aluminum metal plates by the method of the invention. These channels were formed using a constant pin rotation of about 600 rpm and traverse speeds of 2 inches/min (ipm)(FIG. 4), 4 ipm (FIG. 5), and 8 ipm (FIG. 6). The pin used was threaded, was constructed from tool steel, and had the following dimensions: 0.25 in. diameter, 0.25 in. height, and 20 tpi (threads per inch). The surface area per volume for the respective channels was determined to be as follows:

| | Traverse speed (inches/min.) | | |
|---|---|---|---|
| | 2 | 4 | 6 |
| Surface area/volume ($mm^2/mm^3$ i.e., l/mm) | 14.1 | 9.8 | 8.9 |

From these data it is evident that the surface area/volume with a traverse pin speed of 2 ipm was more than 40% greater than with the pin speed of 4 ipm. Increasing the surface area per unit volume increases the heat transfer capacity of the channel, where the channel is used in heat exchange applications.

The depth of the channel is controlled in one embodiment by raising and lowering the pin to different depths within the metal body. This can be accomplished, for example, by simply raising and lowering the pin using the controller set up illustrated in FIGS. 1 and 2, or by using a retractable friction stir tool of the type disclosed in U.S. Pat. No. 5,718,366.

Figure 7:
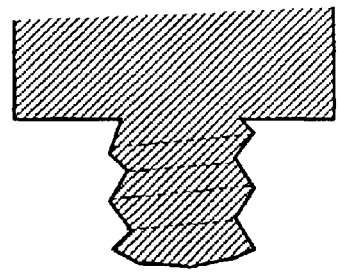
FIGS. 7 and 8 are alternative tool thread designs for use in carrying out the invention.

The pin is preferably threaded in such a manner as to facilitate separation of the material in the bulk metal interior such that a channel is left at the trailing edge of the traversing pin. Threading controls the location of the channel. The movement of material and therefore the shape and location of the integral channels can be manipulated by choice of thread direction and thread design. One thread design is shown schematically in FIG. 7. In this design the pin is threaded circumferentially downwardly in the clockwise direction as viewed from the top to facilitate upward displacement of metal in the metal body upon counterclockwise rotation of the pin when the pin is plunged into the metal body. This schematically illustrates the thread design used to create the channels depicted in cross section in FIGS. 4, 5, and 6. In this embodiment where the pin is threaded in a single rotational direction, two alternative arrangements are preferred: a) the pin is threaded circumferentially downward in a clockwise direction and rotating the pin comprises counter-clockwise rotation; or b) the pin is threaded circumferentially downward in a counter-clockwise direction and rotating the pin comprises clockwise rotation. These arrangements are preferred because they cause the internal material to be pulled upward toward the surface, thus leaving the internal channel. To allow for this upward displacement, the shoulder of the tool is spaced upwardly from the top surface of the bulk material. This is in contrast to friction stirring for welding or other applications, where the tool shoulder is brought into contact with the upper surface of the bulk material.

Figure 8:
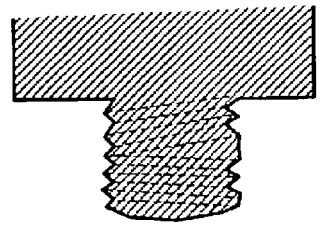

A second thread design having counter-flow characteristics is shown in FIG. 8. In this second thread design a first segment of the pin at the upper end is threaded circumferentially downwardly in the clockwise direction as viewed from the top to facilitate upward displacement of metal in the metal body upon counterclockwise rotation of the pin when it is plunged into the metal body, and a second segment of the pin at the lower end is threaded circumferentially clockwise upwardly to facilitate downward displacement of metal in the metal body upon rotation of the pin when it is plunged into the metal body. With this embodiment of the method, therefore, the pin comprises a first longitudinal pin segment which is threaded circumferentially downward in a clockwise direction and a second longitudinal pin segment which is threaded circumferentially downward in a counter-clockwise direction, and rotating the pin comprises clockwise rotation; or rotating the pin comprises counter-clockwise rotation. The depth of the channel is determined by the location on the pin where the threads change direction, because this is the point of counterflow and therefore the depth location at which the material separates.

Figure 9:
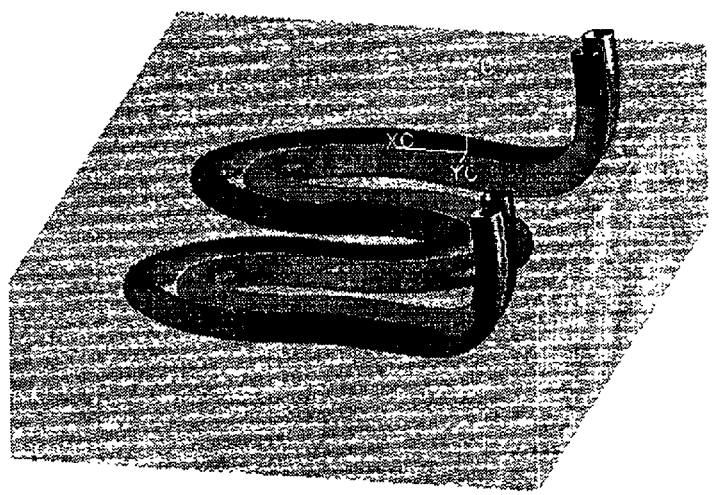
FIGS. 9 and 10 are schematic illustrations of internal channels formed according to the invention.
Figure 10:
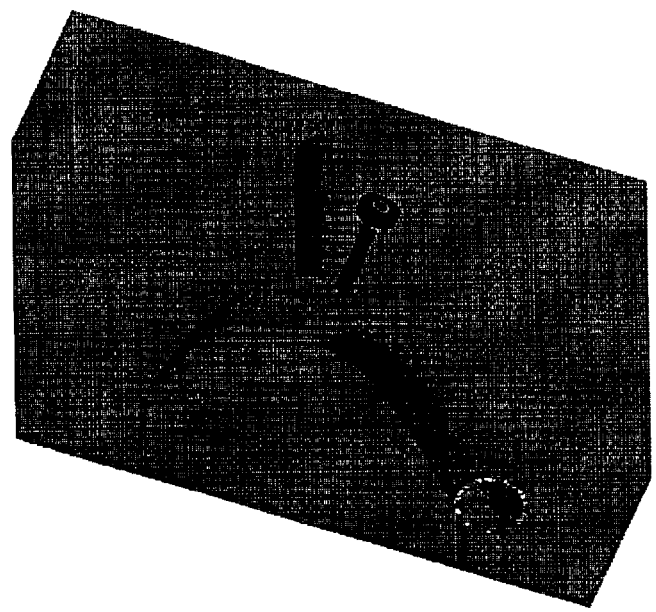

In addition to the simple channel design in FIG. 3, more complex channel designs and intersecting channel designs such as depicted schematically in FIGS. 9 and 10 can be imparted with this invention. In this manner the method of the invention can be used to create channels for adjacent counter-current or co-current hot and cold fluids as in FIG. 9, or for mixing as in FIG. 10. It can be seen from these figures that there is at least one opening at the external surface of the metal body for fluid communication with the internal channels.

One advantage of this invention is that the rotating, plunging, and moving to form the internal channel, in particular, the friction stirring aspect, refines the metallurgical grain size of the deformed material. It thereby creates a strengthened zone adjacent the internal channel. This strengthens the overall bulk material in comparison to a bulk material having a channel therein formed by conventional methods without a strengthened zone. In one embodiment, this strengthened zone is characterized by an average metallurgical grain size which is between about 25% and about 75% smaller than an average metallurgical grain size remote from the internal channel. In another embodiment, the strengthened zone adjacent the internal channel is characterized by an average metallurgical grain size which is at least about 50% smaller than an average metallurgical grain size remote from the internal channel; for example, reduced from about 10 microns to about 5 microns. The strengthened zone typically extends from the channel to a distance of between about 10% and about 50% of a cross sectional width of the channel. For example, in one preferred embodiment the bulk material is Al 5083 having an average bulk grain size of greater than 10 microns. In an embodiment using this material, parameters of pin rotation speed, traverse speed, and otherwise are optionally selected which create a channel having a cross section about 4 mm wide, and a strengthened zone from about 0.2 mm wide on each side of the channel to about 1 mm wide on each side of the channel, with the average grain size in the strengthened zone being on the order of about 3 to about 6 microns.

Also among the advantages of this method and product is that it encompasses channels which are seamless. In particular, the channels are longitudinally seamless in that there are no seams generally parallel to the longitudinal axis of the channel. This is in contrast to channels formed by, for example, removal of material from mating halves of two piece metal body, which channels have a seam or interface where the halves mate. This seamless aspect is particularly advantageous in that it eliminates the risk of leakage at the interface between mating halves.

Another advantage is that the method and product incorporate readily formed non-linear and even serpentine channel patterns, which are also longitudinally seamless. Heretofore such channel patterns could only be formed using a two-piece metal body comprising mating halves in which mating half-channels had been formed. Alternatively, longitudinally seamless channels could heretofore be mechanically drilled, but only in linear fashion. The nonlinear and serpentine aspects of this invention expand the channel patterning options such that they encompass winding patterns with enhanced cooling surface area, where the channels are used for fluid-flow heat exchange.

The channels of the invention can be imparted to any solid metal which is amenable to friction stir processing. These include copper, aluminum, titanium, steel and magnesium. One example is copper plate heat exchangers used to heat engines for space travel. Another example is dies made from steel or aluminum used for plastic injection molding or die casting or permanent mold casting. Friction stir integral cooling channels can provide significant cost and design flexibility for such applications. The present invention also provides an alternative to the method for positioning cooling channels disclosed by Xu et al. at the citation above.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above methods without departing from the scope of the invention, it is intended that all matter contained in the above description or shown in the accompanying drawing shall be interpreted as illustrative and not in a limiting sense.

What is claimed is:

1. A method for forming an internal channel in a metal body comprising:

contacting a surface of the metal body with a pin;
rotating the pin to frictionally heat the surface of the metal body where the pin contacts the metal body;
plunging the rotating pin into the metal body in a direction generally perpendicular to the surface of the metal body; and
moving the pin in a direction generally parallel to the surface of the metal body and generally perpendicular to the axis of rotation such that bulk metal of the metal body closes in behind the pin at the surface to thereby form the internal channel in the metal body.

2. The method of claim 1 wherein the pin is threaded.

3. The method of claim 1 wherein the moving the pin comprises moving the pin non-linearly in the direction generally parallel to the surface of the metal body to thereby form the internal channel non-linearly in the metal body.

4. The method of claim 1 the moving the pin comprises moving the pin serpentinely in the direction generally parallel to the surface of the metal body to thereby form the internal channel serpentinely in the metal body.

5. The method of claim 1 wherein the rotating, plunging, and moving to form the internal channel creates a strengthened zone adjacent the internal channel characterized by an average metallurgical grain size which is between about 25% and about 75% smaller than an average metallurgical grain size remote from the internal channel.

6. The method of claim 1 wherein the rotating, plunging, and moving to form the internal channel creates a strengthened zone adjacent the internal channel characterized by an average metallurgical grain size which is at least about 50% smaller than an average metallurgical grain size remote from the internal channel.

7. The method of claim 5 wherein the rotating, plunging, and moving to form the internal channel creates a refined grain strengthened zone extending from the channel to a distance of between about 10% and about 50% of a cross sectional width of the channel.

8. The method of claim 1 wherein rotating the pin is at a speed of between about 200 and about 2000 rpm.

9. The method of claim 1 wherein moving the pin in a direction generally parallel to the body surface is at a speed between about 0.5 and about 24 inches/minute.

10. The method of claim 1 wherein the pin is threaded circumferentially downward in a first rotational direction and rotating the pin comprises rotation in a second rotational direction opposite to the first rotational direction.

11. The method of claim 1 wherein the pin is threaded circumferentially downward in a clockwise direction and rotating the pin comprises counter-clockwise rotation.

12. The method of claim 1 wherein the pin is threaded circumferentially downward in a counter-clockwise direction and rotating the pin comprises clockwise rotation.

13. The method of claim 1 wherein the pin comprises a first longitudinal pin segment which is threaded circumferentially downward in a clockwise direction and a second longitudinal pin segment which is threaded circumferentially downward in a counter-clockwise direction.

14. The method of claim 1 wherein the pin comprises a first lower longitudinal pin segment which is threaded circumferentially downward in a first direction and a second upper longitudinal pin segment which is threaded circumferentially downward in a second direction opposite the first direction, and said rotating is in said second direction.

15. The method of claim 1 wherein the metal body constitutes a heat exchanger component and the moving the pin in the direction generally parallel to the surface of the metal body to thereby form the internal channel in the metal body constitutes forming a longitudinally seamless internal cooling channel in the heat exchanger component.

16. The method of claim 15 wherein the pin is threaded.

17. The method of claim 15 wherein the moving the pin comprises moving the pin non-linearly in the direction generally parallel to the surface of the heat exchanger component to thereby form the internal channel non-linearly in the heat exchanger component.

18. The method of claim 15 wherein the moving the pin comprises moving the pin serpentinely in the direction generally parallel to the surface of the heat exchanger component to thereby form the internal channel serpentinely in the heat exchanger component.

19. The method of claim 15 wherein the rotating, plunging, and moving the pin to form the internal channel creates a strengthened zone adjacent the internal channel characterized by an average metallurgical grain size which is between about 25% and about 75% smaller than an average metallurgical grain size remote from the internal channel.

20. The method of claim 15 wherein the rotating, plunging, and moving the pin to form the internal channel creates a strengthened zone adjacent the internal channel characterized by an average metallurgical grain size which is at least about 50% smaller than an average metallurgical grain size remote from the internal channel.

21. The method of claim 20 wherein the rotating, plunging, and moving the pin to form the internal channel creates a refined grain strengthened zone extending from the channel to a distance of between about 10% and about 50% of a cross sectional width of the channel.

22. The method of claim 15 wherein rotating the pin is at a speed of between about 200 and about 2000 rpm.

23. The method of claim 15 wherein the moving the pin in a direction generally parallel to the body surface is at a speed between about 0.5 and about 24 inches/minute.

24. The method of claim 15 wherein the pin is threaded circumferentially downward in a first rotational direction and the rotating the pin comprises rotation in a second rotational direction opposite to the first rotational direction.

25. The method of claim 15 wherein the pin is threaded circumferentially downward in a clockwise direction and rotating the pin comprises counter-clockwise rotation.

26. The method of claim 15 wherein the pin is threaded circumferentially downward in a counter-clockwise direction and rotating the pin comprises clockwise rotation.

27. The method of claim 15 wherein the pin comprises a first longitudinal pin segment which is threaded circumferentially downward in a clockwise direction and a second longitudinal pin segment which is threaded circumferentially downward in a counter-clockwise direction.

28. The method of claim 15 wherein the pin comprises a first lower longitudinal pin segment which is threaded circumferentially downward in a first direction and a second upper longitudinal pin segment which is threaded circumferentially downward in a second direction opposite the first direction, and said rotating is in said second direction.

29. The method of claim 15 wherein the surface comprises at least one opening for fluid communication with the seamless internal non-linear channel.

* * * * *